March 2, 1948.   D. J. DESCHAMPS ET AL   2,436,797
FUEL INJECTION PUMP
Filed Dec. 27, 1943   6 Sheets-Sheet 3
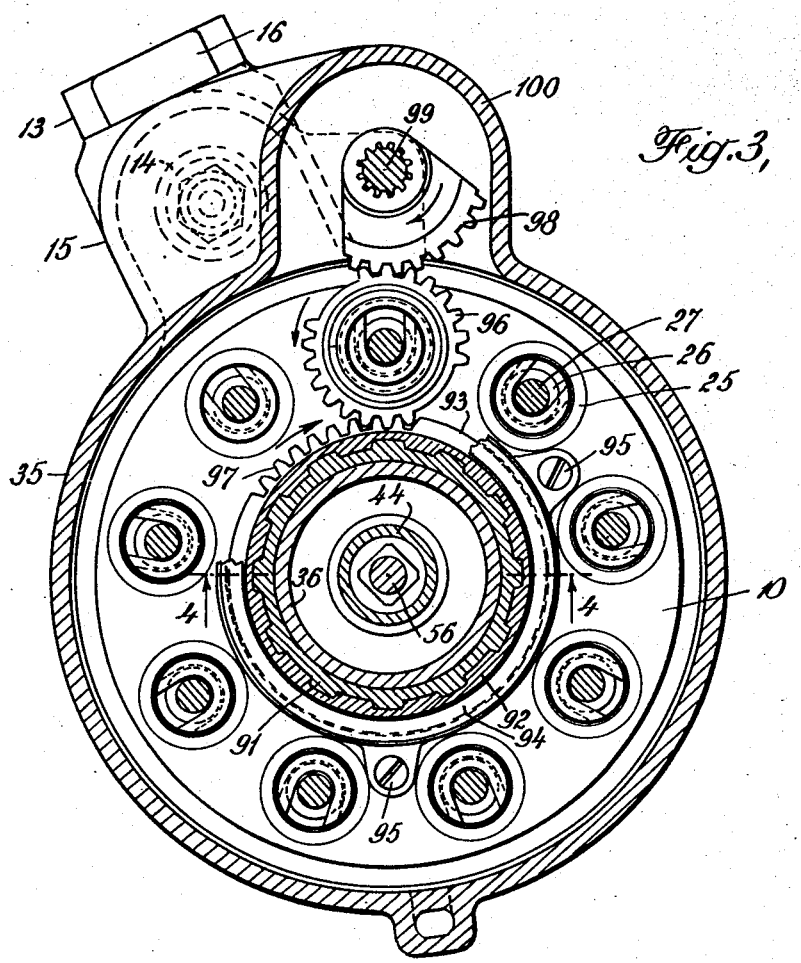
Fig. 3,
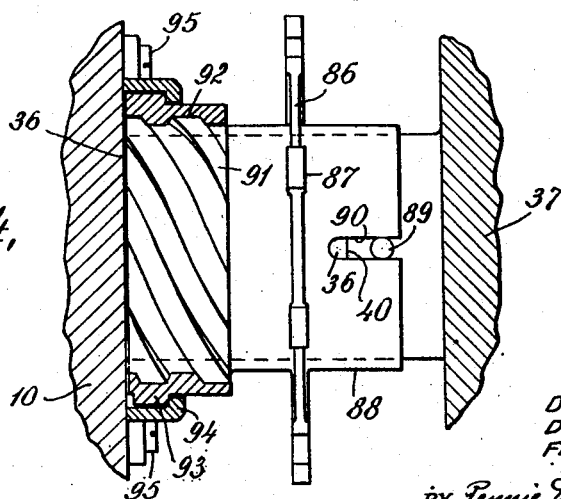
Fig. 4,
INVENTORS
DESIRE J. DESCHAMPS,
DOUGLAS C. CLARKE,
FRANK E. FERGUSON
BY Pennie, Davis, Marvin & Edmonds
THEIR ATTORNEYS

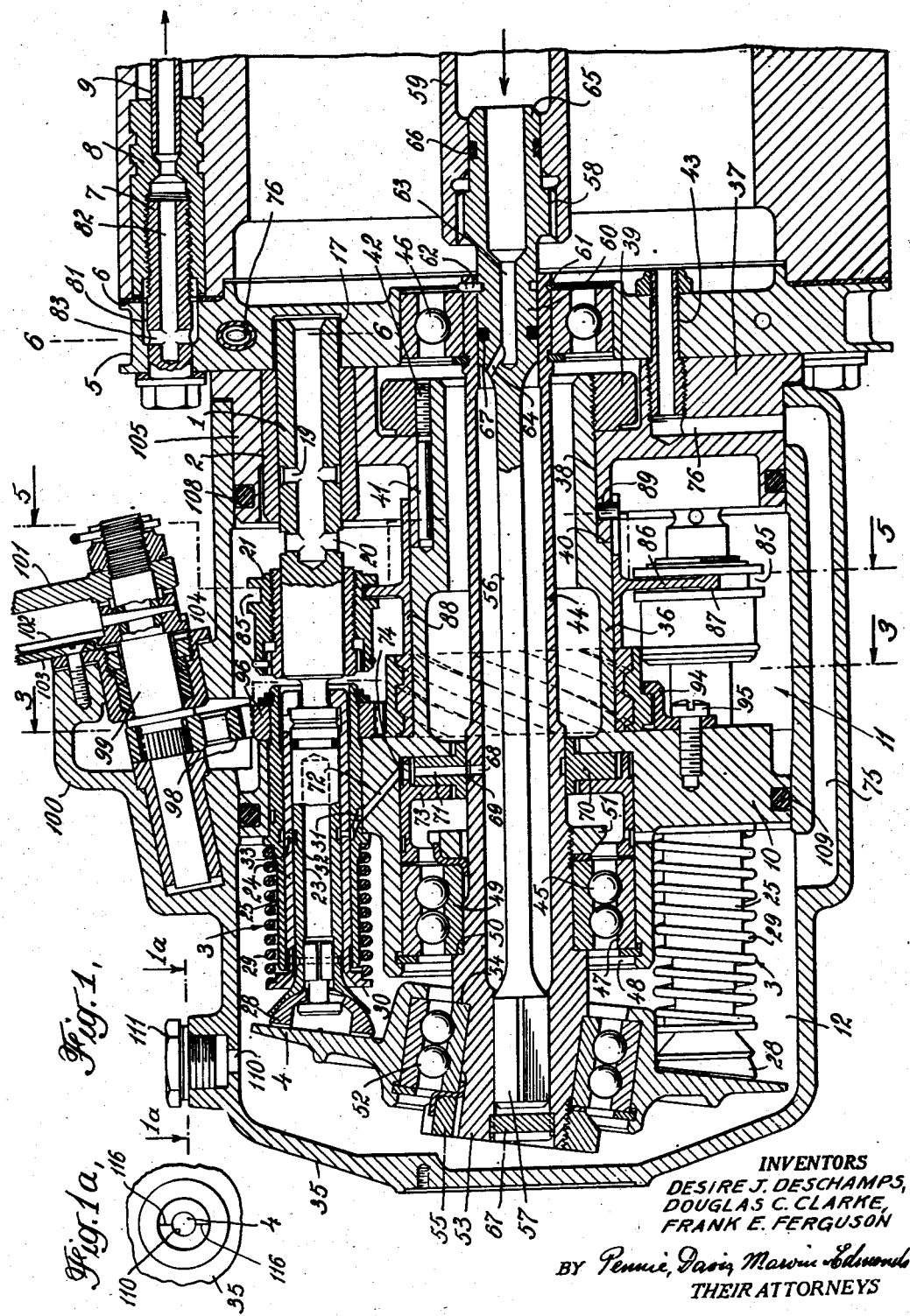

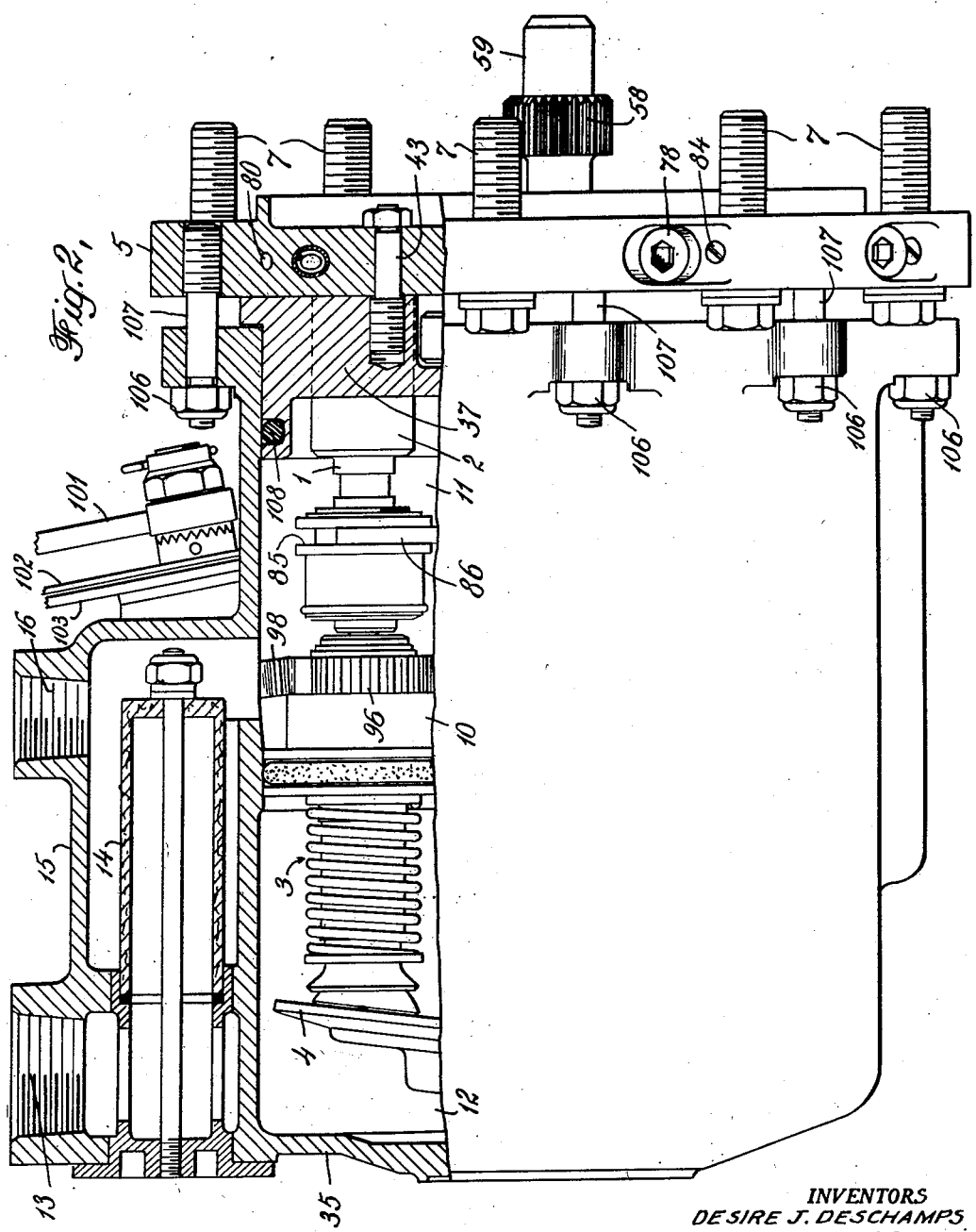

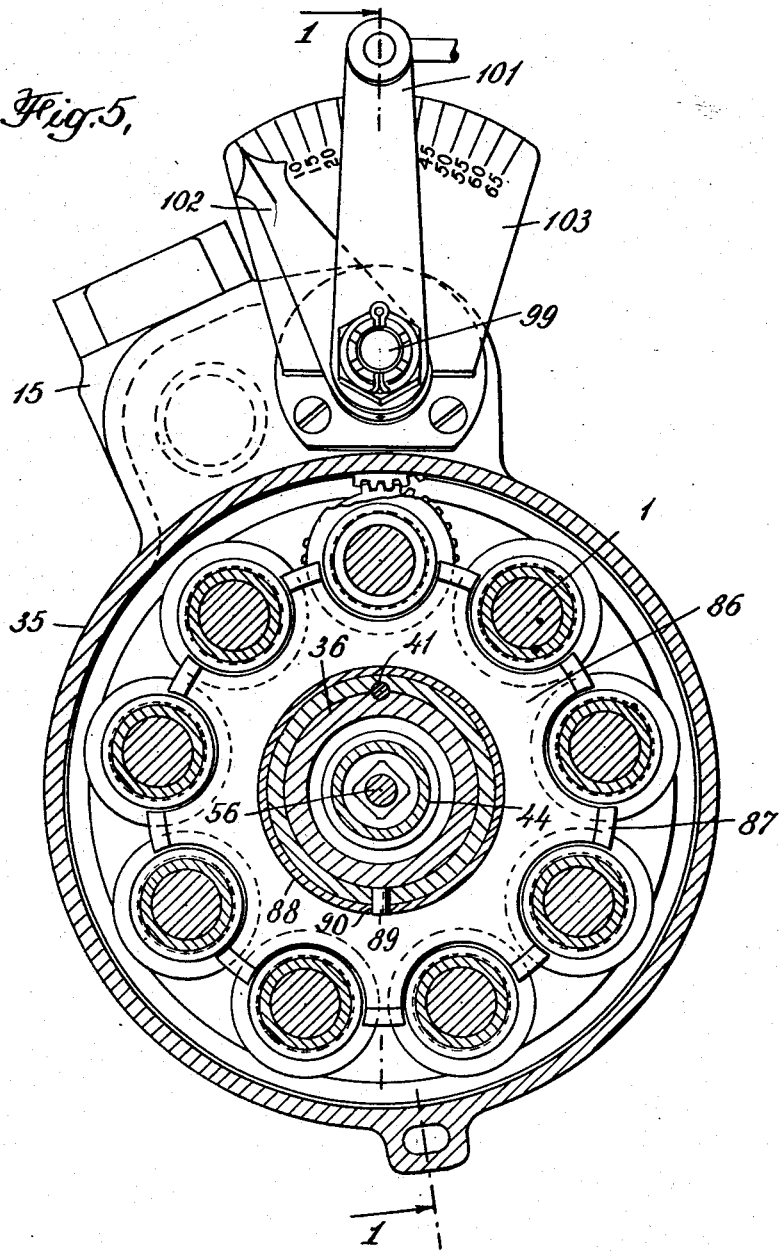

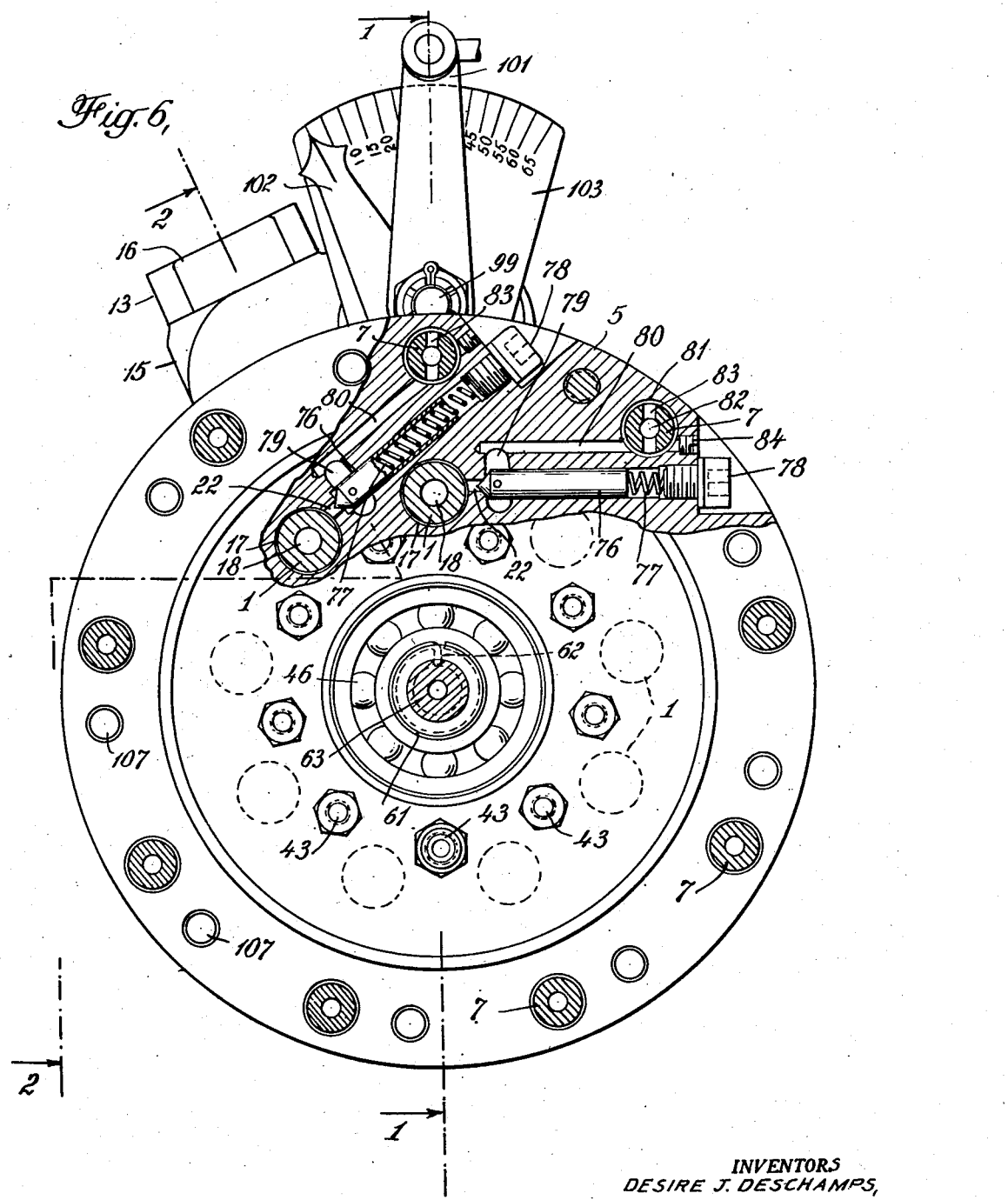

March 2, 1948.  D. J. DESCHAMPS ET AL  2,436,797
FUEL INJECTION PUMP
Filed Dec. 27, 1943  6 Sheets-Sheet 6
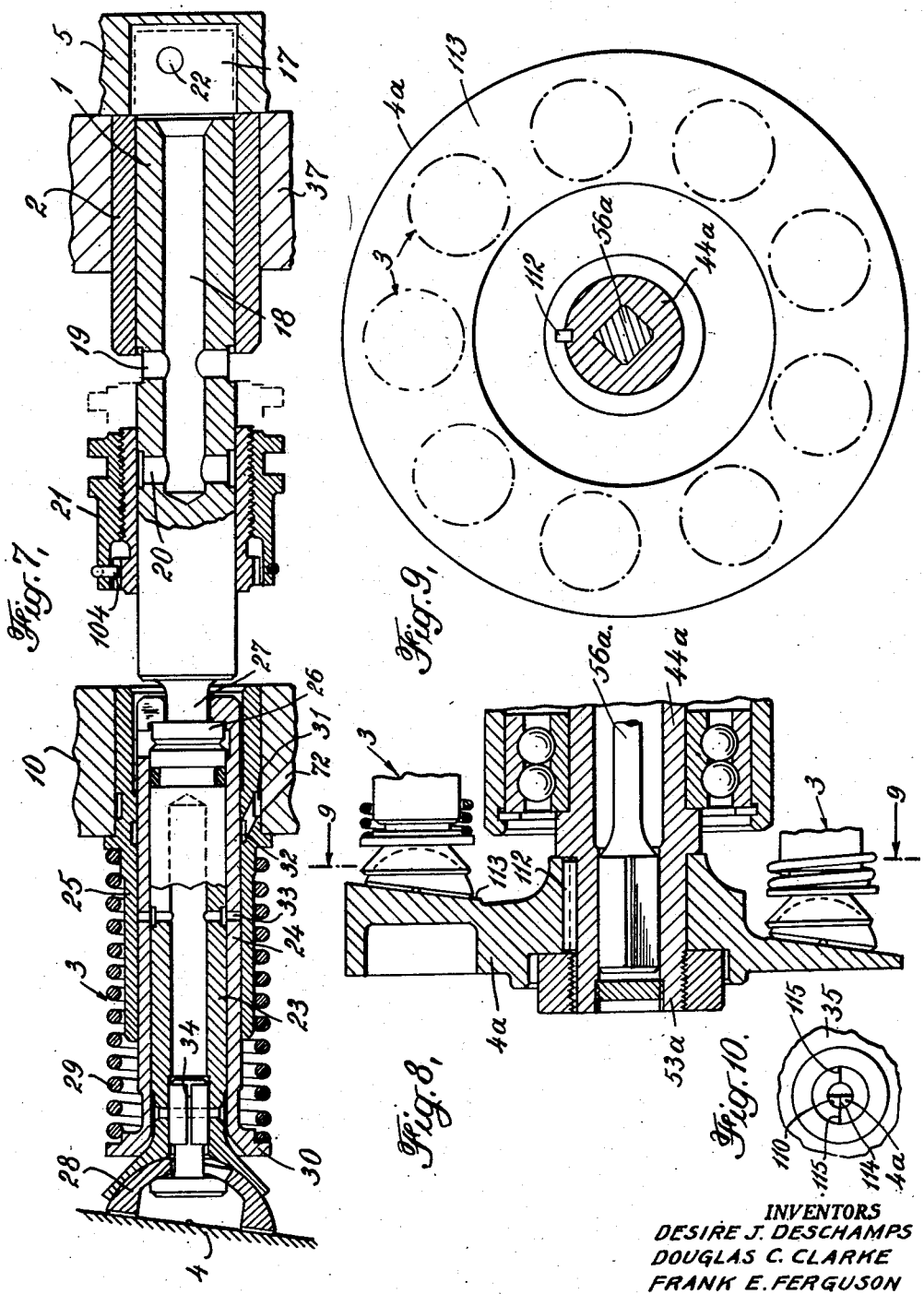
INVENTORS
DESIRE J. DESCHAMPS
DOUGLAS C. CLARKE
FRANK E. FERGUSON
BY Pennie, Davis, Marvin & Edmonds
THEIR ATTORNEYS Patented Mar. 2, 1948

2,436,797

UNITED STATES PATENT OFFICE 2,436,797

FUEL INJECTION PUMP

Desire J. Deschamps, Rutherford, and Douglas C. Clarke, Mountain Lakes, N. J., and Frank E. Ferguson, Bronxville, N. Y., assignors to Deschamps Fuel Injection Corporation, New York, N. Y., a corporation of New York Application December 27, 1943, Serial No. 515,696

11 Claims. (Cl. 103—173)

This invention relates to high speed fuel injection pumps for internal combustion engines and has for its object the provision of an improved high pressure pump for injecting liquid fuel into the engine cylinders.

In application Serial No. 503,470, filed September 23, 1943, by Desire J. Deschamps and Douglas C. Clarke, and copending herewith and assigned to the same assignee as the present application, there is described and claimed a high pressure fuel injection pump which is capable of reliable operation at high speed, which absorbs a comparatively small amount of power from the engine and in which the quantity of fuel injected at each stroke of the several pump plungers can be adjusted with a high degree of accuracy. In that pump also the output varies substantially directly with the engine speed for any given throttle setting, or, in other words, the pump has substantially a straight line delivery curve. It is also capable of operation to provide fixed timing of the beginning of the injection period, the end of this period being varied in accordance with the fuel demands of the engine, or vice versa, with fixed timing of the ending of the injection period, the beginning of the injection being varied according to the engine requirements. That pump also has many advantageous mechanical features including an arrangement of intake and delivery ports of the several plunger cylinders to avoid side thrust on the plungers by unbalanced hydraulic pressure and a plunger driving mechanism which is arranged so as to eliminate mechanical side thrust between the plungers and cylinder walls.

Although the pump of the earlier application is capable of satisfactory operation, the present invention, more specifically, relates to improvements in the arrangement and construction of that pump, it being understood that the pump of the present invention embodies all of the advantages of the former construction, including those mentioned above. The aim of the present invention is to provide a structure which is more compact, lighter, easier to service and lower in cost of production than the construction of the earlier application.

Referring to some of the specific improvements of the present invention, one of the objects of the invention is to provide an extremely rugged arrangement of the plunger actuating element which also facilitates the attaining of a more compact device.

Another object of the present invention is to provide a construction which eliminates the drilling of complicated or long fuel channels in the pump housing or frame and at the same time permits the fuel from the respective pump cylinders to be delivered through the hollow cap screws or studs, by which the pump is attached to the engine, to the fuel ducts within the engine which lead to the various engine cylinders.

Another object of the present invention is to provide an elastic drive to protect the pump from vibration caused by variation in the engine torque and to protect the driving gears of the engine from vibration caused by the fluctuating hydraulic load on the pump plungers.

Another object of the present invention is to provide a pump construction of such a character that the interior mechanism of the pump can be readily exposed, or made accessible, for purposes of adjustment without disassembling the pump or removing it from the engine.

Another object of the invention is to provide for the adjustment and removal of the outlet valves for the individual pump cylinders without disassembling the pump or removing it from the engine.

It has been found difficult to make parts which are subject to hydraulic pressure of cast metal because such metal may be porous to highly volatile liquid such as gasoline under high pressure. Also whether a particular casting will develop leaks of this nature may not be discovered until after many machining operations have been performed on it. The percentage of rejected parts may thus be very large and substantially increase cost of production. Accordingly another object of the present invention is to provide a pump construction in which all of the parts subject to hydraulic pressure are adapted to manufacture by processes which do not include casting operations.

When pumps of this kind are used in connection with aircraft, it is a requirement that they be capable of functioning satisfactory at widely different temperatures, for example, from +120° F. to —60° F. If the material of the pump head, for example, has even a slightly lower coefficient of expansion than that of the cylinder bushings, and the plungers fit the bushings properly at room temperature, for example, around 60° or 70° F., the contraction of the pump head when the temperature is lowered to —60° F. is sufficient to cause the bushings to bind the plungers to such an extent as to prevent the pump from operating. It is difficult to avoid differences in the coefficient of expansion of the material of various parts of the pump such as indicated, otherwise than by making such parts not only of the same kind of metal, but of metal which has had similar metallurgical treatment in its production. It is therefore another object of the invention to provide a pump construction in which substantially all of the parts of the pump can be made at reasonable cost from metal which has been produced by substantially the same metallurgical process; specifically the object is to provide a construction in which all the principal parts of the pump can be successfully manufactured from wrought or forged steel.

The invention will be understood from a consideration of the accompanying drawings which illustrate one embodiment thereof. In these drawings:

Fig. 1 is a view of the pump in vertical longitudinal section taken on the line 1—1 of Fig. 5 looking in the direction of the arrows;

Fig. 1a is a view of a detail looking in the direction of the arrows 1a—1a of Fig. 1 with the plug removed;

Fig. 2 is a view partly in side elevation and partly in section taken on broken line 2—2 of Fig. 6;

Fig. 3 is a transverse vertical section taken on broken line 3—3 of Fig. 1;

Fig. 4 is a detailed section taken on line 4—4 of Fig. 3 with certain parts shown in outside view;

Fig. 5 is a transverse vertical section taken on broken line 5—5 of Fig. 1;

Fig. 6 is an inner end view of the pump removed from the engine with certain parts broken away and shown in section taken on line 6—6 of Fig. 1;

Fig. 7 is a vertical longitudinal sectional view of a single pumping unit drawn to an enlarged scale;

Fig. 8 is a fragmentary vertical longitudinal section showing a modified form of actuating element for the pump plunger; and Fig. 9 is a transverse section taken on line 9—9 of Fig. 8.

Referring now to these drawings, the pump is provided with a plurality of pumping plungers 1 (Figs. 1 and 7) which reciprocate in cylinder bushings 2 and are each driven by a tappet mechanism indicated generally by numeral 3, these tappet mechanisms being driven by a suitable actuating element, such as a wobble plate or a face cam, a wobble plate 4 being shown in the drawings. In the example illustrated the pump has nine of these pumping units and is adapted to supply fuel to the cylinders of a nine-cylinder engine, such, for example, as an aircraft engine. It will be understood, however, that the number of pumping units can be varied to suit the number of engine cylinders.

The pump is provided with a base or mounting plate or "mounting flange" 5 by means of which it is attached to the mounting pad 6 of the engine through the instrumentality of a plurality of hollow cap screws 7. The liquid fuel under pressure from the respective cylinders 1 is led through passages to be described below to the interior of the hollow cap screws 7, each of which is threaded into a steel insert 8 cast into the frame of the engine and having connected therewith a fuel duct 9 leading to one of the engine cylinders.

The pumping units are each constructed as illustrated and described in detail in the before-mentioned copending application. Referring to this construction briefly, the tappet mechanisms 3 are mounted in a thick-walled circular partition or tappet housing 10 which is part of a supporting structure to be described in detail later. Partition 10 divides the interior of the pump into two chambers, or compartments—chamber 11 at the right, which serves as an inlet reservoir, and chamber 12 at the left serving as the lubricant collecting chamber for the lubricating system of the tappet mechanisms.

The gasoline, or other fuel, to be pumped is supplied usually by means of a transfer pump at about 15 pounds' pressure to a connection 13 (Fig. 2) at the top of the pump and flows downwardly to the interior of a filter element 14. Passing through the walls of the filter element, it enters the interior of the filter housing 15 which at its right hand end is in communication with the top of chamber 11. Housing 15 is provided with a connection 16 for a vapor eliminator.

The gasoline enters and fills inlet chamber 11 and enters the pump cylinders (one of which is shown at 17 in Fig. 7), on the back stroke of the plungers 1 through passages in the plungers which consist of an axial passageway 18, an inlet port 19 and a relief port 20. The length of the stroke of the plungers is fixed and is determined by the angularity of the wobble plate 4, the output of each of the pumping units being controlled by means of an output control sleeve 21 which coacts with the relief port 20. On the advance, or working, stroke of the pump plunger, the fuel is ejected from cylinder 17 through passages including an outlet port 22 in the side of the cylinder, to be described in more detail below. The diameter of the cylinder 17 is sufficiently larger than that of plunger 1 so that the liquid can have free access to outlet 22 without imparting side pressure or thrust to the plunger.

Injection begins when the left hand edge of inlet port 19 passes the end of cylinder bushing 2 which closes the inlet port. As the plunger continues its inward stroke, the relief port 20 will be covered for a greater or shorter length of time by the output control sleeve 21, depending upon the position to which this sleeve has been adjusted. Injection ends when the right hand edge of relief port 20 passes the right hand edge of control sleeve 21. In Fig. 7, sleeve 21 is shown in full lines in the position in which the pump output is nil. By means of the output control mechanism to be described, the control sleeves 21 of the nine pump plungers 1 can be moved simultaneously to the right to the dotted position of Fig. 7, which is the position of maximum pump output, or shifted back and forth between these two limiting positions to regulate the output as desired.

Continuing to refer to Fig. 7, the tappet structures 3, which are also described in detail in the before-mentioned copending application, each consist of two telescoping members, a hollow push rod member 23 and a thimble member 24. Thimble 24 slides in an elongated bushing 25 which is fixed in tappet housing 10. Push rod 23 and thimble 24 are arranged at their right hand ends to grasp a head 26 which is at the left hand end of a reduced neck portion 27 formed on each of plungers 1. Head 26 is grasped on its near side by shoulders formed on thimble 24 and is engaged on its outer surface by push rod 23.

At its left hand end push rod 23 is flared and provided with a socket to engage a slipper 28 which, in turn, engages the face of wobble plate 4. A stiff helical spring 29 is so arranged between a flange or bushing 25 and an enlarged head 30 on thimble 24 as to maintain all these parts in engagement with one another at all times so that the plunger 1 is actuated by wobble plate 4 without lost motion, and consequently receives the full motion of the wobble plate.

The tappet mechanisms and the slippers 28 are lubricated by oil under pressure which is delivered to a circular groove 31 in each guide bushing 25 by means to be described in greater detail. This oil flows through a short passage in the bushing to a second groove 32 on the interior of the bushing and at the inner end of each stroke of the plunger and tappet mechanism an aperture 33 in thimble 24 registers with groove 32 and permits a quantity of oil to be forced into additional apertures in the push rod 23 shown in Fig. 7 to the interior of the push rod, all as described in detail in the before-mentioned application. This oil finds its way through a small channel 34 in the member which holds slipper 28 in place, to the rubbing surfaces of the slipper socket and the face of wobble plate 4.

Unlike the pump of the previous application, wobble plate 4 is located at the opposite end of the pump from the base, mounting plate or "mounting flange" 5 and the pump pistons 1, while bushings 2 and cylinders 17 are located close to the mounting plate 5, thereby avoiding the drilling of long and complicated fuel delivery passages. Also the pump of the present invention is provided with a thimble-shaped cover 35 which may be removed to expose the entire mechanism of the pump for inspection and adjustment. This necessitates, however, that the entire pump mechanism, including the plunger actuating element, namely, wobble plate 4, be carried on mounting plate 5.

The "back bone" of this construction comprises two elements, namely, a member which may be termed a hollow or tubular supporting member 36 and a cylinder bushing support or pump head 37. Tubular supporting member 36 extends from a point adjacent mounting plate 5 to a point adjacent the hub or wobble plate 4 and intermediate its ends includes the partition or tappet housing 10 which is integrally formed with it.

Together these members 36 and 37 constitute a composite structure forming a common support for the several pumping units or mechanisms and for the driving mechanism as well. In order to attach tubular member 36 to the pump head or cylinder bushing support 37, the latter is provided with a central cylindrical extension having a central bore 38 within which the right hand end of tubular or hollow member 36 is received and held in fixed position by means of a nut 39 threaded onto its extreme right hand end. Nut 39 lies within a recess in cylinder bushing support 37 and serves, when turned up tight, to force a shoulder 40 on tubular member 36 against the end of the extension extending to the left of cylinder bushing 37 within which bore 38 is machined.

These parts forming this common support are assembled early in the manufacture of the pump but not until after certain other parts to be described later are assembled on the central portion of member 36. In order to hold members 36 and 37 in positively fixed relation to one another, after nut 39 has been screwed home a hole is drilled parallel with its axis, half of which is in the nut and half in tubular member 36, this hole being drilled inwardly as far as shoulder 40. Within this hole is placed a round key 41 which locks the two members 36 and 37 together, and then the outer end of the hole is tapped to receive a threaded key 42 which serves as a lock for nut 39. In order to assure accurate alignment the holes in cylinder bushing support 37 which receive cylinder bushings 2, and the holes in housing 10 for guide bushings 25 of the tappet mechanisms, may be machined after members 36 and 37, constituting the common support, have been assembled.

In order to attach the common support constituted of members 36 and 37 to mounting plate 5, a series of stud bolts 43 (Figs. 2 and 6) are fixed in holes tapped in the outer surface of cylinder bushing support 37. These bolts pass through holes in plate 5 and receive nuts 44 on their outer ends.

The plunger actuating element 4 is mounted on a hollow shaft 44 which extends substantially from end to end of the pump and is supported by means of two widely spaced ball bearings 45 and 46. The stationary race 47 for the outer ball bearing 45 is mounted within a recess 48 in the outer or left hand end of tubular supporting member 36, recess 48 being within a cylindrical projection at the left of tappet housing 10. The inner ball race 49 of bearing 45 is locked against a shoulder 50 at the outer end of hollow shaft 44 by means of a nut 51 threaded upon this shaft. Ball bearing 46 has its outer ball race supported in a central aperture in mounting plate 5 and its inner race secured in any suitable manner on the inner or left hand end of sleeve shaft 44. The wobble plate 4 is of the non-rotating type and its motion is imparted to it through the instrumentality of ball bearing 52 which is mounted on the outer end 53 of shaft 44 at the desired angle to the axis of this shaft. The inner race of this ball bearing is forced against a shoulder 54 by means of a nut 55 threaded onto the outer end of shaft 44.

The wide spacing between the two supporting bearings 45 and 46 for wobble plate shaft 44 provide a rigid support for this shaft which is desirable, in view of the bending stresses existing in this shaft by virtue of the driving forces applied to the plunger tappets in placing the fuel under the high pressure required for injection.

Wobble plate shaft 44 is driven by means of a small flexible and torsionally resilient shaft or quill 56 which is squared at 57 at its outer end and received within a square aperture in the outer end 53 of sleeve shaft 44. At its inner end shaft 56 is splined, as indicated at 58, by means of which it is connected to a driving shaft 59 provided on the engine and driven through suitable gearing from the engine main shaft. Shaft 56, as shown in Fig. 1, passes centrally through hollow shaft 44 and near its right hand end has an enlargement 60 which fits the interior of shaft 44 opposite bearing 46 with a predetermined clearance. This clearance, together with the flexibility of shaft 56, and appropriate clearance at the squared end 57, renders the pump self-alining with respect to the center of driving shaft 59. Shaft 56 is held in position for assembly purposes by means of a snap ring 61 encircling the outer right hand end of hollow shaft 44 and having one end 62 projecting through an aperture in this shaft and into a recess or groove in shaft 56.

The lateral flexibility of shaft 56 assists in making the pump self-alining, and through the torsional flexibility of this shaft an elastic drive is provided between wobble plate 4 and driving shaft 59 of the engine which serves to protect the pump from stress due to violent fluctuation in engine torque and to absorb the vibration due to the pumping action and keep this vibration from being transmitted in its entirety to the engine gears which operate shaft 59.

In order to supply lubrication to the tappet mechanisms 3, oil under pressure from the engine oil lubricating system is supplied through the interior of driving shaft 59 through passageways 63 and 64 to the space surrounding flexible shaft 56 within hollow shaft 44. In order to conduct the oil from shaft 59 to passageway 63 the outer end of shaft 56 is enlarged as shown at 65, inwardly of the splines 58, this enlargement coacting with the interior of shaft 59 which is preferably reduced somewhat in diameter for this purpose. A packing ring 66 may be employed as a seal. A second packing ring 67 is also introduced between the enlargement 60 of shaft 56 and the interior surface of hollow shaft 44. As the square left hand end 57 of shaft 56 fits rather loosely within its square aperture, to assist in the self alining action previously referred to, in order to confine the oil within hollow shaft 44, a plug 67 is inserted at its outer or left hand end.

For the purpose of transferring the oil under pressure from within the rotating hollow shaft 44 to a stationary part of the pump so that it may be conveyed to the tappet mechanisms, the construction shown at the center of Fig. 1 is employed. An aperture 68 drilled through the wall of shaft 44 conveys the oil to a circular groove 69 in the outer surface of this shaft. Surrounding the shaft opposite groove 69 there is a floating ring 70. This ring has a hub portion which extends a sufficient distance lengthwise of the shaft to prevent the oil from escaping from groove 69 between the ring and shaft. The oil can pass outwardly, however, through one or more radial apertures 71 in the ring to its periphery to a lubricant distributing channel surrounding the ring. From this channel it is led by means of inclined drilled passageways 72 to the respective grooves 31 (Fig. 7) of the respective tappet mechanisms 3.

Ring 70 is mounted at the bottom of recess 48 within which ball bearing 45 is mounted. The radial faces of ring 70 coact respectively with the bottom of recess 48 and with the surface of a member 73 which is inserted in the recess ahead of the outer bearing race 47 of ball bearing 45. Member 73 has a projection 74 which engages the bottom of recess 48 in order to maintain the face of member 73 and the bottom of the recess properly spaced from one another to accommodate the thickness of ring 71.

The oil, after lubricating the tappet mechanisms 3 collects in the bottom of the chamber 12 and flows through a longitudinal passageway 75 formed at the bottom of pump cover 35 to the inner end of the cover. Here it enters a vertical passage 76 drilled in cylinder bushing support 37 and rises upwardly to the lowermost of the series of stud bolts 43. This bolt is hollow, as is indicated in Figs. 1 and 6, and the oil flows through it back into the interior of the engine and returns to the engine oil circulating system.

The placing of the wobble plate 4 at the outer end of the pump has enabled the cylinder bushings 2 and cylinders 17 to be located adjacent mounting plate 5 where the outlets from the respective cylinders are close to the attaching cap screws 7 so that long and complicated drilled passages in the pump are avoided. Also, as shown in Figs. 1 and 7, the inner ends of the respective pump cylinders which have been designated as cylinders 17, are formed as recesses in the inner surface of mounting plate 5 which are arranged in registry with the ends of the respective cylinder bushings 2. By this arrangement the cylinder outlet passages which convey the fuel under high pressure are formed entirely within plate 5.

Thus, for example, referring to Fig. 6, the outlet passages and outlet valves for two of the cylinders 17 are illustrated in the sectional portion of this view. The outlet passage 22 is a drilled opening which intersects the cylinder wall 17. This is a short passage which communicates with a larger drilled hole within which slides the outlet valve 76. This valve seats at the outer end of passage 22 and is held against its seat by means of a helical spring 77. Both the valve and its spring are held in position by means of a nut 78 which is accessible in a recess in the periphery of mounting plate 5 when it is desired to remove valves for inspection or replacement. The fuel, after passing the valve seat at the inner end of valve 76, enters a lateral chamber 79 which connects with a hole 80 drilled parallel with the axis of valve 76, and this hole communicates with a chamber 81 surrounding one of the cap screws 7 (Fig. 1).

These cap screws are each drilled axially as indicated at 82, and crosswise as indicated at 83, so as to convey the oil from chamber 81 to the inner end of the cap screw, which is in communication with duct 9, this duct leading to one of the engine cylinders, as previously referred to. It will be understood that the outer end of drilled hole 80 is provided with a plug 84 and this plug also terminates within the same recess in the periphery of plate 5 as valve retaining nut 78 is located.

The shortened fuel passages provided by this construction not only reduce the cost of production of the pump but improve its operation by avoiding the frictional losses which inevitably occur when forcing a liquid through long tortuous passages. It also renders the outlet valves accessible for inspection and replacement without removing the pump from the engine or without removing any other part of the pump.

In order to control or vary the output of the pump it is necessary to move the nine output control sleeves 21 simultaneously either to the right or to the left, as previously described in connection with Fig. 7. As stated in the above-mentioned copending application it is important to accomplish this longitudinal shifting of the individual output control sleeves with minimum friction, and without imparting side pressure to the pump plungers, in order to obtain accurate output control and to prevent wear of the plungers under the high speed at which the pump operates. It is also important to accomplish positive movement of the output control sleeves 21 in both directions. The improved mechanism for providing for this control is shown in Figs. 1-5, inclusive.

Sleeves 21 are each provided with a circular groove 85. As in the previous construction, a disk 86 having a thickened margin or bead 87 at its periphery, is arranged within the circular ring of control sleeves. The disk is provided with semicircular notches at its periphery forming between them fingers which engage groove 85 of these sleeves.

As shown in Fig. 4, disk 86 is mounted on and preferably formed integral with an elongated sleeve 88 which is arranged to slide longitudinally on the outer surface of tubular supporting member 36 at the right of partition wall or tappet housing 10. This sleeve is shown in section in Fig. 1. In order to prevent sleeve 88 from turning as it slides longitudinally and to keep the notches in its periphery centered with respect to the sleeves 21, a pin 89 (Figs. 4 and 1) which is fixed to the inward extension of cylinder bushing support 37 engages a longitudinal notch 90 in sleeve 88.

Adjacent tappet housing 10, sleeve 88 is provided with a series of high pitch or fast lead threads 91 which are closely fitted to a similar threaded nut 92 and this nut is provided exteriorly with a circular shoulder 93 which is engaged by a closely fitting collar 94 in order to prevent endwise movement of nut 92 as it is turned. Collar 94 is fixed to the right hand surface of tappet housing 10 by means of screws 95.

The guide bushing 25 for the tappet thimble 24 of the uppermost tappet mechanism 3 is somewhat longer than the guide bushings of the remaining tappet mechanisms and projects a sufficient distance to the right of tappet housing 10, as shown in Fig. 1, to receive a pinion member 96 which is held thereon in any suitable manner, as by means of the washer and snap ring shown.

The teeth of the lower portion of this pinion 96 engage a series of teeth 97 cut in the surface of the upper portion of circular rib 93 of nut 92, while the teeth of the upper portion of pinion 96 are engaged by the teeth of a sector 98 which is splined to a shaft 99. Shaft 99 is arranged for rocking movement in a housing 100 projecting from the upper part of the pump cover 35 adjacent the gasoline intake housing 15. On one end of shaft 100 an operating lever 101 is fixed which is adapted to be connected with the engine governor or fuel-air ratio control mechanism. It will be understood that as lever 101 is rocked either to the left or right, as shown in Fig. 5, motion will be imparted through the gearing just described to rotate nut 92, which rotation through the threads 91, will cause sleeve 88 and disk 86 to be shifted axially and thus shift the nine output control sleeves 21 accordingly.

Adjacent operating lever 101 a pointer 102 is preferably fixed to shaft 99, and a stationary index plate 103 may be fixed to housing 100 immediately behind this pointer. The pointer may indicate on a suitable scale, for example from 0° to 65°, the setting of the output control sleeves 21.

It will be understood that each of the output control sleeves 21 is constructed as shown and described in detail in the before-mentioned copending application for the purpose of adjusting each of the nine pumping units individually so as to bring them all to a uniform output. In brief, this is accomplished by making the control sleeve in two parts, the outer part being threaded onto the inner part, as shown in Fig. 7. This enables the control edge of the sleeve which is the right hand edge of the inner part to be adjusted axially with respect to the outer part which is engaged by the fingers of operating disk 86. After the adjustment has been attained, the two parts are locked together by means of the snap ring and notch arrangement indicated generally by numeral 104 in Fig. 7.

The thimble shaped cover 35 of the pump fits over a cylindrical portion 105 on cylinder bushing support 37 and is held in position by means of a series of nuts 106 which are threaded onto the ends of stud bolts 107 tapped into the mounting plate 5. It is necessary to provide tight joints between the cover and cylindrical surface 105 to prevent the escape of gasoline, and this is accomplished by means of a circular packing 108, mounted in a groove cut in cylindrical surface 105, and consisting of a rubber-like synthetic material which possesses resiliency and is not attacked by the liquid to be pumped. A similar packing ring 109 is provided between the exterior surface of partition wall or tappet housing 10 and the inner surface of cover 35.

On the upper side near the outer end of cover 35 there is provided an inspection opening 110 which is closed by a plug 111 and through which visual inspection of the injection timing may be made by noting the position of the plunger actuating element. When a floating actuating element, such as wobble plate 4, is used, a reference mark 116 is placed adjacent opening 110 (Fig. 1a) to indicate the position of the face of wobble plate 4 at the beginning of injection of one of the pumping units which may be designated as unit #1.

When a non-floating or rotating actuating element, such as wobble plate 4a of Figs. 8 and 9 is used, a reference mark such as indicated at 114 in Fig. 10 may be placed on the edge of the actuating member 4a so that when the mark is brought into alignment with stationary index marks 115 on opposite sides of the inspection opening 110 it will indicate the beginning of the injection period of pumping unit #1.

Referring now to the modified form of wobble plate, referred to above and shown in Figs. 8 and 9, the head 53a of the wobble plate shaft 44a may be made straight, that is, in line with the axis of the shaft instead of being formed at an angle thereto as is the head portion 53 in Fig. 1. The wobble plate 4a is mounted directly upon the head 53a and is fixed thereto as, for example, by means of a key 112, so that the wobble plate rotates with shaft 44a. The operating face 113 of the wobble plate is disposed at the required angle to the axis of shaft 44a to produce the desired length of stroke of the pump plunger. Shaft 44a is driven by a flexible shaft 56a and the construction is otherwise like that of the floating type of wobble plate 4.

With the improvements of the present invention, the various rotating parts of the pump are rigidly supported on the mounting plate 5 independently of the covering shell 35. An especially rugged and rigid wobble plate shaft construction is provided with its supporting bearings widely spaced apart, although the pump is more compact than that of the before-mentioned application, its over-all length being shorter than in that pump. Also an elastic drive has been provided which eases the load on the pump driving gears within the engine. Provision has been made for introducing oil under pressure from the engine lubricating system through the interior of the driving shaft, for conveying this oil to the tappet structures and returning it to the engine lubricating system. The transposing of the locations of the plunger actuating element 4 and the pump cylinders not only affords the advantages just mentioned but also places the outlet openings from the cylinders adjacent to the hollow supporting cap screws 7 by means of which the pump is both supported in position on the engine and the gasoline under pressure is connected to the various ducts leading to the engine cylinders. The location of the inner portions of the pumping cylinders as recesses within mounting plate 5 enables all of these connecting passages to be formed within this mounting plate.

With the features of construction just referred to, together with the removal cover 35, the removal of this shell exposes the plunger driving mechanism, including the slippers, tappets and springs and also the pump output control sleeves. Hence, all of these parts may be adjusted, or even replaced without removing the pump from the engine. The only part which must be disconnected is the rod (not shown) which actuates the output control lever 101. The outlet valves for each of the pumping cylinders are accessible for adjustment or replacement without disassembling any other part of the pump. The mechanism controlling the pump output has been simplified and is positive in action for decreasing as well as for increasing the output.

The improved construction is capable of being manufactured using a minimum of cast parts. The outer shell or cover is in fact the only casting employed and this is a part which is not subjected to any mechanical stresses or to hydraulic pressure. The various parts of the pump mechanism, including the tubular member 36 of the composite common support, can be machined from forgings and bar stock which are not of a porous nature and therefore not subject to development of leaks.

From the foregoing it will be understood that considerable variation in the construction and arrangement of the various parts of the improved pump is possible without proceeding beyond the bounds of the invention, and it will be further understood that the scope of the invention extends to all such structures which fall within the meaning of the appended claims.

We claim:

1. In a fuel injection pump, a mounting plate for attaching the pump to the engine, a plurality of pumping units each including a cylinder, a plunger cooperating therewith and a tappet mechanism for operating said plunger, a common support for said cylinders and tappet mechanisms, said support being secured to said mounting plate, actuating means for said tappet mechanisms, and a removable cover member secured to said mounting plate enclosing said pump mechanism, said pumping units and said actuating means being supported on said common support and independently of said cover member.

2. In a fuel injection pump, a mounting plate for attaching the pump to the engine, a plurality of pumping units each including a cylinder, a plunger cooperating therewith and a tappet mechanism for operating said plunger, a common support for said cylinders and tappet mechanisms, said support being secured to said mounting plate, a removable cover member secured to said mounting plate enclosing said pump mechanism and removable from said mounting plate independently of said common support, an actuating element for said tappet mechanisms and an operating shaft for said element.

3. In a fuel injection pump, a mounting plate for attaching the pump to the engine, a plurality of pumping units each including a plunger and a tappet mechanism for actuating the same, said plungers being disposed adjacent said mounting plate, a common support for said several tappet mechanisms, said support having a central aperture therethrough and being carried by said mounting plate, an actuating element for said tappet mechanisms disposed at the outer end of said common support, an operating shaft for said actuating element extending through said aperture, a bearing therefor within the outer end of said aperture and a second bearing therefor carried by said mounting plate.

4. In a fuel injection pump, a mounting plate for attaching the pump to the engine, a plurality of pumping units each including a plunger and a tappet mechanism for actuating the same, the plungers being disposed adjacent said mounting plate, a common support for said several tappet mechanisms, said support having a central aperture therethrough and being carried by said mounting plate, an actuating element for said tappet mechanisms disposed at the outer end of said common support, a hollow operating shaft therefor within said aperture and extending through said mounting plate, a bearing therefor within the outer end of said aperture, a second bearing therefor carried by said mounting plate and a flexible drive shaft within said hollow shaft having a driving connection with said hollow shaft at its outer end and extending beyond the inner end of said hollow shaft to be connected with the engine.

5. In a fuel injection pump, a mounting plate for attaching the pump to the engine, a thimble-shaped cylindrical cover removably secured to said mounting plate, a plurality of pumping mechanisms each including a cylinder, a plunger cooperating therewith and a tappet mechanism for operating the plunger, a common supporting structure for the several pumping mechanisms, said structure having a cylindrical portion adjacent said mounting plate to receive the end of said cover and including means to support the several cylinders, said common supporting structure also having intermediate its ends a cylindrical flange portion forming a supporting housing for said tappet mechanisms, said common supporting structure having a central aperture therethrough, a central aperture in said mounting plate in registry therewith, an actuating element for said tappet mechanisms disposed at the outer end of said common support, an operating shaft for said actuating element supported in part by said common support and in part by said mounting plate, said cover cooperating with the cylindrical portion of the cylinder supporting means and with the cylindrical surface of said flange to divide the space within the pump into two fluid tight chambers, one serving as an inlet for the liquid to be pumped and the other as a collection chamber for lubricant, the pump plungers having passages therein to admit liquid from said inlet chamber to the respective cylinders, and means for supplying lubricant to said tappet mechanisms and for withdrawing the lubricant which collects in said collection chamber.

6. In a fuel injection pump, a plurality of pumping units each including a reciprocating plunger and tappet mechanism for imparting reciprocation thereto, an actuating element for reciprocating said tappet mechanisms, said tappet mechanisms being adapted for pressure lubrication and each being provided with a duct for the supply of lubricant under pressure, a hollow operating shaft for said actuating element, means for supplying lubricant under pressure to the interior of said shaft, and means for receiving lubricant from the interior of said rotating shaft and distributing it to the respective lubricant supply ducts of said tappet mechanisms.

7. In a fuel injection pump, a plurality of pumping units each including a reciprocating plunger and tappet mechanism for imparting reciprocation thereto, an actuating element for reciprocating said tappet mechanisms, said tappet mechanisms being adapted for pressure lubrication and each being provided with a duct for the supply of lubricant under pressure, a hollow operating shaft for said actuating element, means for supplying lubricant under pressure to the interior of said shaft, a floating ring fitted to the exterior of said hollow shaft and provided with stationary radially positioned confining surfaces on either side thereof providing between them a lubricant distributing channel surrounding the periphery of said ring, said channel being in communication with the lubricant supply supply passageways of said tappet mechanisms, at least one oil-conveying passage from the inner to the outer surface of said ring, a groove in the outer surface of said hollow shaft in alignment with said passage and an opening from the interior of said shaft to said groove.

8. In a fuel injection pump, a mounting member for attaching the pump to the engine, a hollow operating shaft extending outwardly therefrom, a plurality of pumping units disposed around said shaft, actuating means for said pumping units operated by said hollow shaft, said units being disposed between said actuating means and said mounting member, and a flexible drive shaft within said hollow shaft having a driving connection therewith adjacent said actuating means.

9. In a fuel injection pump, a mounting plate for attaching the pump to the engine, a plurality of pumping units each including a plunger and a tappet mechanism for actuating the same, the plunger being disposed adjacent said mounting plate, a common support for said several tappet mechanisms, said support having a central aperture therethrough and being carried by said mounting plate, an actuating element for said tappet mechanisms disposed at the outer end of said common support, a hollow operating shaft therefor within said aperture, a bearing therefor near the outer end of said aperture, a second bearing therefor near said mounting plate and a flexible drive shaft within said hollow shaft having a driving connection with said hollow shaft at its outer end and extending beyond the inner end of said hollow shaft to be connected with the engine.

10. In a fuel injection pump, a mounting plate for attaching the pump to the engine, a plurality of pumping mechanisms each including a cylinder, a plunger cooperating therewith and a tappet mechanism for operating the plunger, a common supporting structure for the several pumping mechanisms, said structure including means to support the several cylinders and having intermediate its ends a flange portion forming a supporting housing for said tappet mechanisms, an actuating element for said tappet mechanisms, and means for rotatably driving said actuating element.

11. In a fuel injection pump, a mounting plate for attaching the pump to the engine, a removable thimble-shaped cylindrical cover, a plurality of pumping mechanisms each including a cylinder, a plunger cooperating therewith and a tappet mechanism for operating the plunger, a common supporting structure for the several pumping mechanisms, said structure having a cylindrical portion adjacent said mounting plate to receive the end of said cover member and including means to support the several cylinders, said common supporting structure also having intermediate its ends a cylindrical flange portion forming a supporting housing for said tappet mechanisms, an actuating element for said tappet mechanisms disposed at the outer end of said common supporting structure, and means for rotatably driving the same, said cover member cooperating with the cylindrical portion of said cylinder supporting means and with the cylindrical surface of said flange to divide the space within the pump into two fluid-tight chambers, one serving as an inlet for the liquid to be pumped and the other as a collection chamber for lubricant and surrounding the tappet mechanism, the pump plungers having passages therein to admit liquid from said inlet chamber to the respective cylinders, and means for supplying lubricant to said tappet mechanisms and for withdrawing the lubricant which collects in said tappet chamber.

DESIRE J. DESCHAMPS.
DOUGLAS C. CLARKE.
FRANK E. FERGUSON.

REFERENCES CITED

The following references are of record in the file of this patent:

UNITED STATES PATENTS

| Number | Name | Date |
|---|---|---|
| 2,123,815 | Tweddell | July 12, 1938 |
| 2,215,827 | Ditto | Sept. 24, 1940 |
| 2,251,783 | Davis | Aug. 5, 1941 |
| 2,282,562 | Cole | May 12, 1942 |
| 2,093,477 | Parsons | Sept. 21, 1937 |
| 2,138,194 | Pfauser | Nov. 29, 1938 |
| 2,193,612 | Alden | Mar. 12, 1940 |
| Re. 21,966 | Purdy | Dec. 2, 1941 |
| 1,392,389 | Anderson | Oct. 4, 1921 |
| 1,933,081 | Stephan | Oct. 31, 1933 |
| 2,031,346 | Wahlmark | Feb. 18, 1936 |
| 2,083,021 | High | June 8, 1937 |
| 2,131,857 | Lauret | Oct. 4, 1938 |
| 2,142,086 | Alden | Jan. 3, 1939 |
| 2,160,735 | Hoffer | May 30, 1939 |
| 2,160,978 | Mock | June 6, 1939 |
| 2,165,696 | Charter | July 11, 1939 |
| 2,286,301 | Parsons | June 16, 1942 |
| 2,299,235 | Snader | Oct. 20, 1942 |